July 13, 1965  S. M. RICH  3,194,608
SAFETY MEANS IN AIR BRAKE EQUIPMENT
Filed May 1, 1963
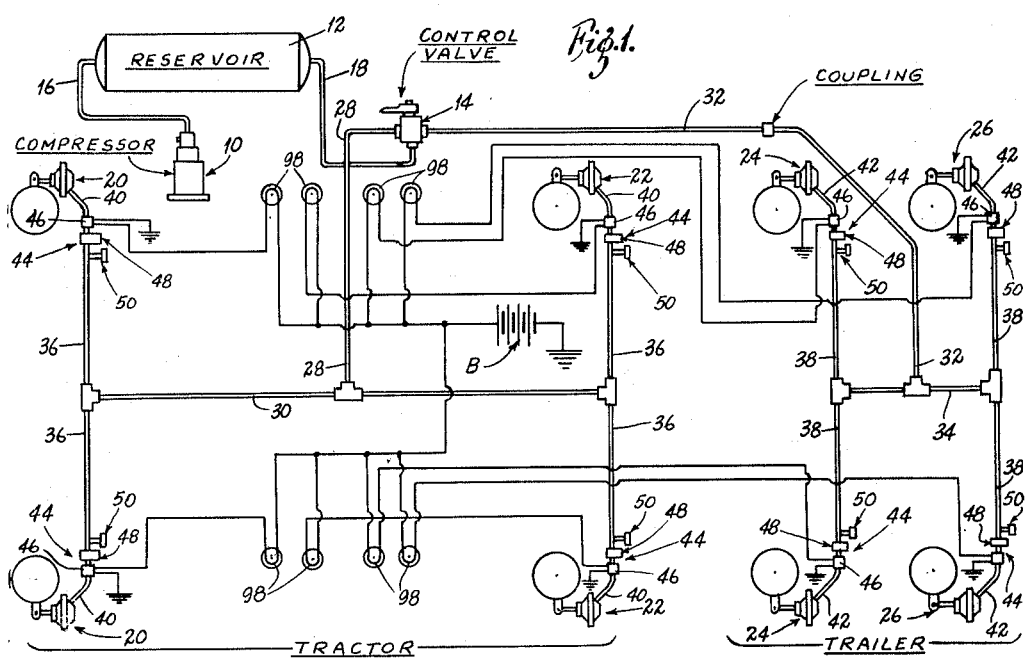
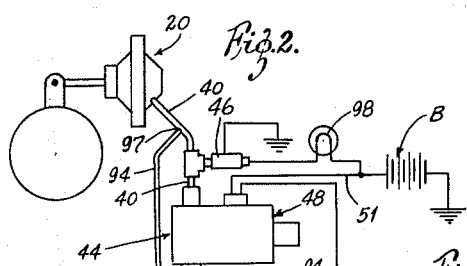
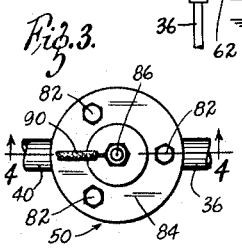
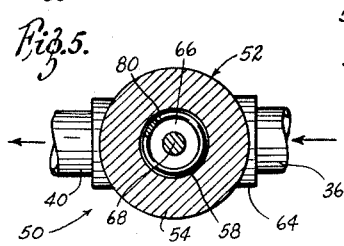
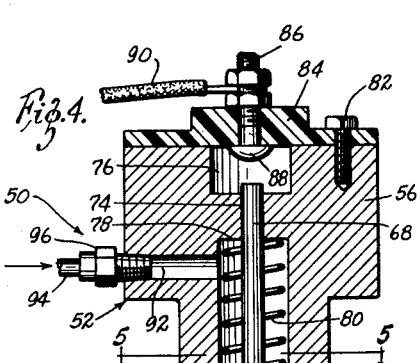
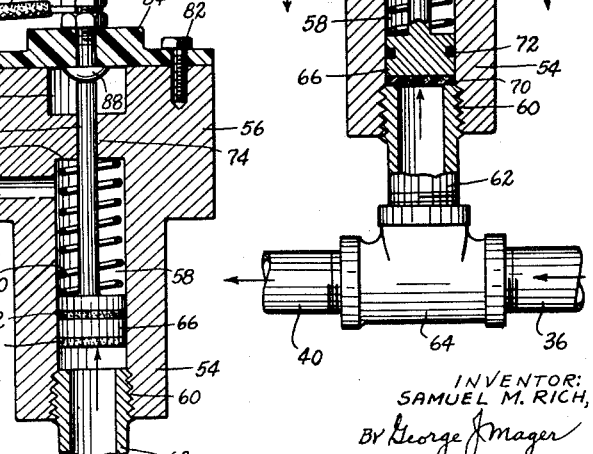
INVENTOR:
SAMUEL M. RICH,
By George J Mager
HIS ATTORNEY

United States Patent Office 3,194,608
Patented July 13, 1965

3,194,608
SAFETY MEANS IN AIR BRAKE EQUIPMENT
Samuel M. Rich, 15 Aberdeen Place,
University City 5, Mo.
Filed May 1, 1963, Ser. No. 277,154
4 Claims. (Cl. 303—84)

In general, the present invention relates to air brake equipment. More particularly, the invention is directed to novel safety means that may readily be incorporated in conventional air brake systems, primarily though not necessarily of the type installed on tractor-trailer combinations wherein the brakes of both vehicles are operable in response to manipulations of a control valve by the operator of the tractor.

Generally as is well known, conventional tractor-trailer air brake equipment includes a compressor, a compressed air storage tank or reservoir, brake mechanism associated with each of the tractor and trailer wheels, a manual control valve, and conduit connections for supplying compressed air simultaneously to all of the brake mechanisms.

In addition to the mechanisms and appurtenances mentioned in the preceding paragraph, air brake equipment of the type under consideration includes various check valves, quick air release valves, governors, gauges and the like, wherewith the present invention is not concerned. Also included in such equipment is a device adapted to energize the compressor whenever the pressure in the reservoir drops below a determined value. That is to say, whenever in consequence of a prior brake application some of the stored pressure has been dissipated, the compressor will automatically replenish the reservoir immediately, so that compressed air requisite for a subsequent brake application is always available, as is understood.

Insofar as I am aware however, none of these air brake systems (with the exception of that disclosed in Patent No. 2,977,157, granted to me on March 28, 1961), includes means for preventing operational failure or malfunctioning of the brakes in the event that one or more of the terminal conduits leading to the wheel brake mechanisms had been rupted subsequent to the previous braking operation.

In other words, assuming that a tractor-trailer is being driven for example over a rough road, it sometimes happens that rocks, sticks, or other loose objects lying on the road will impinge against and rupture a line adjacent to one of the wheel brake mechanisms. Excessive vibration may also cause a break in one or more of said lines, so that without knowledge thereof on the part of the tractor operator, his next brake application will not only be futile, but may result in disaster. That is to say, in the event a ruptured line is present in conventional air brake equipment, application of the brakes, particularly in an emergency, frequently results in a serious accident. Thus, when the tractor operator manipulates the control valve whereby to transmit requisite air power to the wheel brake mechanisms, most of said power discharges instead to atmosphere via the rupture, as is understood.

The primary object of the present invention therefore, is to provide means adapted to automatically prevent pressure losses in consequence of a ruptured line in air brake equipment of the type under consideration, and means adapted to visibly indicate to the operator that a ruptured line is existent in said equipment.

It is a further object related to said primary object, not only to visibly indicate to the operator that a ruptured line is existent in the equipment, but also to indicate the particular line wherein said rupture exists, so that repairs may be made at the earliest opportunity.

Accordingly, the present invention contemplates the interpolation of a compact safety assemblage in the pressure transmission lines near each wheel of the vehicle or combination vehicle serviced by an air brake system, together with a plurality of signal lights or indicators operatively associated with a component of said assemblage. It is a feature of this invention that the assemblages and signal elements aforesaid may be incorporated in conventional air brake equipment without requiring any changes in the usual mode of operation.

Each safety assemblage includes three major components, these being a normally open solenoid valve and an indicating light pressure switch in respect to which no claim is made herein, and a novel differential air pressure switch unit constructed in accordance with the concepts of this invention.

The normally open solenoid valve aforesaid is connected into the battery circuit of the vehicle, and constitutes a high pressure two-way valve that includes plunger means adapted, when the coil component thereof is energized, to instantly arrest further fluid flow from the inlet to the outlet port of said valve. An ideal solenoid valve of this character is disclosed in Patent No. 2,614,584, issued on October 21, 1952.

The indicating light switch included in each safety assemblage aforesaid comprises a conventional pressure responsive switch that may be of the normally open, or of the normally closed type. This switch as will appear, is interposed in the line leading from the outlet port of the solenoid valve to the wheel brake mechanism.

The signal lights controlled by the switches referred to in the preceding paragraph, would be disposed in full view of the tractor operator, and would be appropriately marked to indicate the brake mechanism of the particular vehicle wheel wherewith each of them is associated.

Each differential air pressure switch unit included in the safety assemblages of the present invention is comprised of a hollow cylindrical housing including a body portion surmounted by a head portion. A contact or terminal element is stationarily mounted centrally atop said housing, but insulated therefrom. A piston is slidably disposed in a cylindrical bore provided in the housing, said piston having a contact stem of reduced diameter. The lower end portion of the bore is threaded, and receives one end of a conduit adapted to deliver air pressure into the housing, as will appear.

A light compression spring, interposed about said stem between the piston body and an internal shoulder provided in the housing, normally biases the piston and its stem in a direction away from the terminal element, and against the upper end of the air pressure conduit aforesaid.

As will be explained in more detail hereinafter, the biasing force of said compression spring is per se not sufficient to maintain the piston seated against the end of the air pressure conduit during a braking operation. However, a by-pass tube leading from the terminal line that supplies the brake mechanism, will deliver air pressure to the housing during a braking operation so long as the operational functioning of said mechanism has not been impaired. This air pressure is delivered into the cylindrical bore of the housing in a plane above the piston. Consequently, inasmuch as the pressure values of the air entering said housing above and below the piston are equal and counterbalance one another, seating of said piston against the upper or delivery end of pressure conduit would be effected solely by the inherent biasing force of the compression spring aforesaid.

In the event that for example, a broken hose or diaphragm should develop in the brake mechanism of a wheel, then the air pressure would escape to atmosphere instead of being brought to bear against the upper face of the piston via said by-pass tube, so that the air pressure concurrently directed against the lower face of the piston would instantaneously overcome the biasing force of the light compression spring.

Consequently, the piston would immediately move upwardly to bring the extremity of its stem into contact with the terminal element, whereby to energize the normally open solenoid valve, said valve being connected into the circuit leading from the vehicle battery, and the terminal element of the switch housing being connected by a wire leading therefrom to the electromagnetic coil of said valve.

The invention is illustrated on a sheet of drawings that accompanies this specification, and a more comprehensive understanding of the objectives and advantages thereof may be had from the detailed description that follows with reference to said drawings, wherein:

FIGURE 1 is a diagrammatical layout of conventional tractor-trailer air brake equipment provided with safety means in accordance with the concepts of the present invention;

FIGURE 2 is a schematic layout on an enlarged scale and in greater detail, of one of the safety assemblages appearing in the FIGURE 1 layout;

FIGURE 3 is a top plan view of the differential air pressure switch unit of the invention;

FIGURE 4 is a sectional view of said switch unit taken on the line 4—4 of FIGURE 3;

FIGURE 5 is a sectional view of said switch unit taken on the line 5—5 of FIGURE 4; and FIGURE 6 is a fragmentary view similar to FIGURE 4, with certain elements shown in moved positions.

The exemplary air brake equipment schematically shown in FIGURE 1 includes: a compressor 10; a compressed air storage tank or reservoir 12; a manual control valve 14; an air line 16 leading from the compressor to the reservoir; another air line 18 leading from the reservoir to the hand valve; tractor front wheel brake mechanisms 20; tractor rear wheel brake mechanisms 22; trailer front wheel brake mechanisms 24; trailer rear wheel brake mechanisms 26; a main pressure line 28 leading from the control valve 14 to a tractor pressure header 30; another pressure line 32 leading from said control valve to a trailer pressure header 34; branch pressure lines 36, each leading from the header 30 to one of the tractor wheel mechanisms; and branch pressure lines 38, each leading from the header 34 to one of the trailer wheel brake mechanisms.

It will be understood that the compressor 10, the reservoir 12, the control valve 14, their interconnecting lines 16 and 18, the main pressure lines 28 and 32, the headers 30 and 34, and the branch lines aforesaid leading from the headers are all protected against normal road hazards. The terminal portions 40 of the branch lines 36, and the terminal portions 42 of the branch lines 38 however, are subject to the hazards hereinbefore described, inasmuch as these are necessarily close to ground level.

In accordance with the concepts of the present invention, a safety assemblage is interposed in each of the branch pressure lines adjacent the wheel brake mechanisms of the tractor, and of the trailer. These assemblages are designated as a whole by the numeral 44.

Because of the space limitations in FIGURE 1, a single assemblage is schematically shown on an enlarged scale, and in greater detail, in FIGURE 2. There it is seen that each assemblage 44 includes a conventional indicating light switch 46, a conventional solenoid valve 48, and a differential air pressure switch unit generally designated 50 that comprises the principal component of the present invention.

The switch 46 will be considered to be of the normally closed type that will open and remain in open status whenever air under pressure is existent in the terminal portion of the branch line 40 or 42 wherein it is interpolated.

The solenoid valve 48 is comprised of a conventional two-way high flow valve of the normally open type, and includes plunger operable means, adapted when said valve is deenergized, to permit open flow of air pressure through the valve. When the valve is energized however, the plunger operable means aforesaid instantaneously arrests further flow of air pressure through said valve. As hereinbefore observed, the present invention lays no claim to the structure of said valve, wherefore it has only been schematically portrayed in the drawings. Movements of the included plunger are controlled by an electro-magnetic coil, and numeral 51 designates a wire connecting said coil into the electrical circuit leading from the vehicle battery B.

The differential air pressure switch unit 50 and the components of the assemblage 44 immediately associated therewith, are particularly illustrated in FIGURES 3 through 6. In the detailed description that follows with respect to these views, it is to be understood that such terms as "upper," "lower," "vertical," "horizontal," "top," "bottom," and the like as employed herein, have been adopted solely in the interest of descriptive clarity with respect to the unit 50 as illustrated, inasmuch as these units may be installed in a brake system in any other feasible disposition without affecting the operability of them, as should be apparent. Incidentally, this observation also applies to the disposition of the solenoid valves.

Each unit 50 includes a hollow cylindrical switch housing generally designated 52, having a body portion 54 surmounted by a head portion 56. A vertical cylindrical bore 58 is provided centrally of the housing, extending through the body portion 54 and terminating at its upper end within the head portion 56. The lower end portion of said bore is threaded as shown at 60, to engage the upper end of a nipple 62. Numeral 64 designates a T member interposed in the branch pressure line 36, the lower end of said nipple being connected into the T as shown. In consequence of this arrangement air under pressure passing through the line 36 from the control valve 14, also passes upwardly through the nipple 62 as should be evident.

Slidably disposed in the cylindrical bore 58 is a piston 66, having a stem 68 of reduced diameter, that projects upwardly therefrom. A sealing disc 70, formed of rubber or similar material, is bonded to the bottom face of the piston, and preferably but not necessarily, the piston body is also provided with a circumferential seal in the form of an O-ring 72.

The upper end portion of the piston stem 68 is slidably supported in a bore 74 of reduced diameter that is formed concentric with the cylindrical bore, and extends between an annular contact cavity 76 provided in the head portion 56, and the cylindrical bore 58. Numeral 78 indicates a shoulder that defines the upper end of the cylindrical bore 58, and interposed about the valve stem 68 between said shoulder and the top face of the piston 66 is a light compression spring 80.

Secured atop the switch housing 52 by means of cap screws 82 as shown or otherwise, is a top closure plate 84 of insulative material, preferably plastic. Mounted centrally in said plate is a terminal element 86, illustrated as being a screw having a contact head 88. The head 88 projects into the cavity 76, and is in alignment with the piston stem 68. The shank of the terminal is threaded, projects above the plate 84, and has one end of a wire 90 secured thereto by means of nuts as shown, or otherwise.

A horizontally disposed air passage 92 is formed in the head portion 56, and is in fluid communication at its inner end with the cylindrical bore 58. One end of an air pressure by-pass tube 94 is connected via a fitting 96 into the outer end of the passage 92.

With reference also to FIGURE 2, the wire 90 connects the terminal 86 with the electro-magnetic coil of the solenoid valve 48, said coil (not shown) being also connected into the battery circuit by the wire 51, as earlier noted. The end of the air pressure tube 94 remote from the fitting 96, is suitably connected into the terminal line 40 adjacent to the indicating light switch 46, as suggested at 97.

It will be remembered as noted hereinbefore, that the descriptive terminology with respect to the disposition of the structure particularly illustrated in FIGURES 3 through 6 has been employed in the interest of clarity only, with reference to the drawings. Thus the safety assemblage 44 will operate efficiently irrespective of whether the components thereof are vertically, horizontally, or angularly incorporated in the brake system. It will also be understood that appropriate means are contemplated for stabilizing the assemblages 44 after these have been interpolated in the branch lines. Any showing of such supporting means has been omitted in the drawings, inasmuch as these may vary considerably in different installations, and form no part of the present invention.

The conventional pressure-responsive switches 46 are appropriately interpolated in the terminal lines 40 or 42 adjacent the solenoid switches 48. Each switch 46 is both grounded and connected into the electrical circuit of the battery B. Each switch also controls a signal lamp 98 that is mounted for visual observation by the tractor operator as he manipulates the control valve 14.

Preferably, the lamps 98 would be arranged in a pattern corresponding to the wheel brake pattern of the tractor-trailer, or each lamp could be appropriately marked to indicate the particular wheel safety assemblage 44 with which it is associated.

Operation

Although it is believed that the manner wherein the invention attains its objectives should be apparent from the foregoing description and the drawings, a further explanation will be given. Thus, it will be assumed that a tractor-trailer combination vehicle has been loaded, and is in readiness for departure from a warehouse loading platform, or a dock and the like. After turning on the ignition, the operator would test the brakes before placing the tractor in gear. As the operator manipulates the control valve 14 to brake application position, air pressure delivered to the various brake mechanisms would first pass through the safety assemblages 44. In the event that all of the terminal lines 40 and 42 were intact at that time, two effects would be instantly resultant. The normally closed indicating light pressure switches 46 would open, thus deenergizing all of the lamps 98. Simultaneously, as the air pressure is directed against the piston 66 from below via the nipple 62, air pressure of equal value would be delivered into the cylinder 58 via the by-pass tube 94 and passage 92, and directed against said piston from above. Inasmuch as the pressure from above counterbalances that from below, the piston 66 will be maintained in the position thereof illustrated in FIGURE 4, in consequence of the biasing force of the light compression spring 80.

With the piston 66 thus maintained in the FIGURE 4 position, the upper end of the stem 68 will be spaced from the contact head 88 of the terminal element 86 as shown, wherefore the normally open solenoid valve 48 would permit free flow of air pressure therethrough.

With the foregoing in mind, it should be apparent that if all of the signal lamps 98 are "darkened" instantly following the trial brake application, then the operator will know that the entire tractor-trailer brake equipment is for the time being, in fully operable safe condition.

In the event however that one of the signal lamps 98 continues to glow during said trial brake application, then the operator will know that the terminal line of the indicated brake mechanism is defective, whereupon repairs would be made.

It is believed apropos at this point to describe the condition of a safety assemblage 44 in consequence of an injury sustained by the terminal air pressure line associated therewith. Thus with particular reference to FIGURE 2 and a comparison of FIGURES 4 and 6, when a rupture occurs therein or the terminal line 40 is so damaged that the air pressure being delivered thereto escapes to atmosphere, then the piston 66 is instaneously propelled upwardly because no pressure delivery via the by-pass line 94 to the cylindrical bore 58 is had, and the pressure exerted against the piston via the nipple 62 would now be more than sufficient to overcome the biasing force of the compression spring 80. Thus, the moment that any air pressure escapes in the line beyond the light indicating switch 46, the piston stem 68 impinges against the terminal contact head 88 and closes the coil circuit of the solenoid valve 48. Consequently, said valve immediately closes, whereby to arrest any flow of air pressure therethrough. Thus it should be apparent, that when a break does occur, the loss of air pressure from the system would be negligible.

Assuming now that all of the brake mechanisms of the system are in working order, the tractor operator can safely begin his journey. As the vehicle proceeds, each time a brake application would be required, the operator would be alerted via the signal lamps in the event that a break had occurred in the interim since the prior brake application. However, and this is most important, he would at the same time be apprised that the other brake mechanisms are fully operable.

Inasmuch as intermittent partial applications of the brakes in rounding curves and so on is routine on the part of the operator, he will be regularly reminded that all of the wheel brakes are functioning properly, or that one and perhaps two of them are not functioning and should therefore be repaired at the first opportunity.

Obviously, the inclusion of the signal lamps is not a requirement, inasmuch as the differential pressure switch units 50 operate independently of the switches 46, and serve to energize the solenoid valves immediately upon a braking operation should a terminal line have been damaged. It should thus be manifest that the invention provides novel means to render air brake equipment safe.

It will be understood that although primarily concerned with tractor-trailer air brake equipment such as that typified in FIGURE 1, the present invention is not limited to such installations, but may also be employed to provide similar safety means in other air brake equipment.

It is furthermore to be understood that although a pressure switch for controlling an associated signal lamp has been included in each safety assemblage 44, no claim is made herein to such switch or switch-lamp combination per se, the primary objective of the invention being to instantaneously prevent further air pressure losses from the system following a break in the line, or the development of a leak at the wheel brake mechanism.

What I claim is:

1. In tractor-trailer air brake equipment of the type described including terminal lines for supplying air pressure simultaneously to each of the brake operating mechanisms, means adapted to insure the operability of the other brake mechanisms even though the terminal line leading to any one of the included brake mechanisms has been broken, said means comprising an assemblage interpolated in each terminal line adjacent the brake mechanism and including:

a normally open solenoid valve;

a differential air pressure switch unit mounted in a housing;

electrical connections between the valve, the switch unit and the battery of the tractor-trailer electrical system;

an air pressure by-pass tube leading from the terminal line to said switch housing;

a piston slidably disposed in a cylindrical bore centrally of the switch housing, said piston having an integral upwardly extending stem;

a light compression spring interposed in the cylindrical bore about the stem between the upper end of said bore and the top face of the piston;

a stationary contact element mounted in a closure plate atop the switch housing in alignment with the piston stem; and means for delivering air pressure to said bore below the piston causing said stem to engage the contact element whereby to energize the solenoid valve to closed position when the air pressure delivered to the bore above the piston via the by-pass tube ceases.

2. In a differential pressure switch unit interpolated near the terminal portion of an air pressure delivery line leading to a wheel brake operating mechanism incorporated in air brake equipment of the type disclosed, said switch being adjacent to and electrically connected into the electro-magnetic coil of a normally open solenoid valve also interpolated in said line:

a cylindrical switch housing having a body portion surmounted by a head portion;

a vertical cylindrical bore provided centrally of the housing, said bore extending through the body portion and terminating at its upper end within the head portion of the housing, the lower end portion of the bore being threaded;

a piston slidably disposed in the cylindrical bore, said piston having a stem of reduced diameter that projects upwardly therefrom;

a sealing disc bonded to the bottom face of the piston;

a bore of reduced diameter formed in the head portion concentric with the cylindrical bore aforesaid;

an annular contact cavity provided in the head portion, said bore of reduced diameter extending between said cavity and the upper end of the cylindrical bore;

a light compression spring interposed about the piston stem between the upper end of the cylindrical bore and the top face of the piston;

a closure plate of insulative material secured atop the switch housing;

a terminal element mounted centrally in said closure plate, said terminal element having a contact head projecting into the annular cavity in alignment with the stem of the piston; and a horizontally disposed air passage formed in the head portion with its inner end in fluid communication with the cylindrical bore in a plane above the piston therein, and its outer end in fluid communication with a by-pass tube leading from the terminal portion of the air pressure delivery line aforesaid.

3. In a differential pressure switch unit interpolated near the terminal portion of an air pressure delivery line leading to a wheel brake operating mechanism incorporated in air brake equipment of the type disclosed, said switch being adjacent to and electrically connected into the electro-magnet coil of a normally open solenoid valve also interpolated in said line:

a cylindrical switch housing having a body portion surmounted by a head portion;

a vertical cylindrical bore provided centrally of the housing, said bore extending through the body portion and terminating at its upper end within the head portion of the housing, the lower end portion of the bore being threaded;

a piston slidably disposed in the cylindrical bore, said piston having a stem of reduced diameter that projects upwardly therefrom;

a sealing disc bonded to the bottom face of the piston;

a bore of reduced diameter formed in the head portion concentric with the cylindrical bore aforesaid;

an annular contact cavity provided in the head portion, said bore of reduced diameter extending between said cavity and the upper end of the cylindrical bore with the piston stem slidably disposed therein;

a light compression spring interposed about the piston stem between the upper end of the cylindrical bore and the top face of the piston;

a closure plate of insulative material secured atop the switch housing;

a terminal element mounted centrally in said closure plate, said terminal element having a contact head projecting into the annular cavity in alignment with the stem of the piston;

an electrical connection in the form of a wire leading from the coil of said solenoid valve, said wire having the end thereof remote from the valve secured to the terminal element;

a horizontally disposed air passage formed in the head portion with its inner end in fluid communication with the cylindrical bore in a plane above the piston therein; and an air pressure by-pass tube having one end thereof connected into the outer end portion of said passageway, and its opposite end connected into the terminal portion aforesaid of the air pressure delivery line.

4. In an assemblage for incorporation in air brake equipment of the character described, said assemblage including an indicating light switch and a normally open solenoid valve, a differential pressure switch unit also included in said assemblage for energizing the solenoid valve to closed position when a break occurs in the terminal portion of the pressure line wherein the assemblage is interpolated, said unit comprising:

a cylindrical switch housing including a body portion surmounted by a head portion;

a vertical cylindrical bore extending centrally in the housing through the body portion and terminating at its upper end in an annular shoulder within the head portion, the lower end portion of said bore being threaded to engage the upper end of a nipple for delivering air pressure to the bore;

a piston slidably disposed in the cylindrical bore, said piston having a sealing disc bonded to the bottom face thereof and being provided with a circumferential sealing ring;

a stem of reduced diameter integral therewith projecting upwardly from the piston;

an annular cavity in the head portion of the housing;

a bore having a diameter corresponding to that of said stem extending between said cavity and the shoulder of the cylindrical bore, the upper end portion of the stem being slidable in the reduced bore and projecting into said cavity;

a light compression spring interposed about the piston stem between said annular shoulder and the top face of the piston for biasing said piston into sealing engagement with the upper end of said nipple;

a closure plate of insulative material secured atop the head portion;

a terminal element mounted centrally in said closure plate, said terminal element having a contact head projecting into the annular cavity in alignment with the piston stem but spaced from the upper end portion thereof, and having a shank portion projecting above the closure plate for securement thereto of one end of a wire leading from the electro-magnetic coil of said solenoid valve; and a horizontally disposed passage in the head portion having its inner end in fluid communication with the cylindrical bore in a plane above the piston therein, and having its outer end in fluid communication with one end of a by-pass air pressure tube, the opposite end of said tube being connected into the terminal portion aforesaid of the pressure line.

No references cited.

MILTON BUCHLER, *Primary Examiner.*

FERGUS S. MIDDLETON, *Examiner.*